May 21, 1929.   R. E. ROYSE   1,714,449
COMBINED STEAM ELECTRIC DRIVE FOR GENERATOR SETS
Filed July 5, 1928
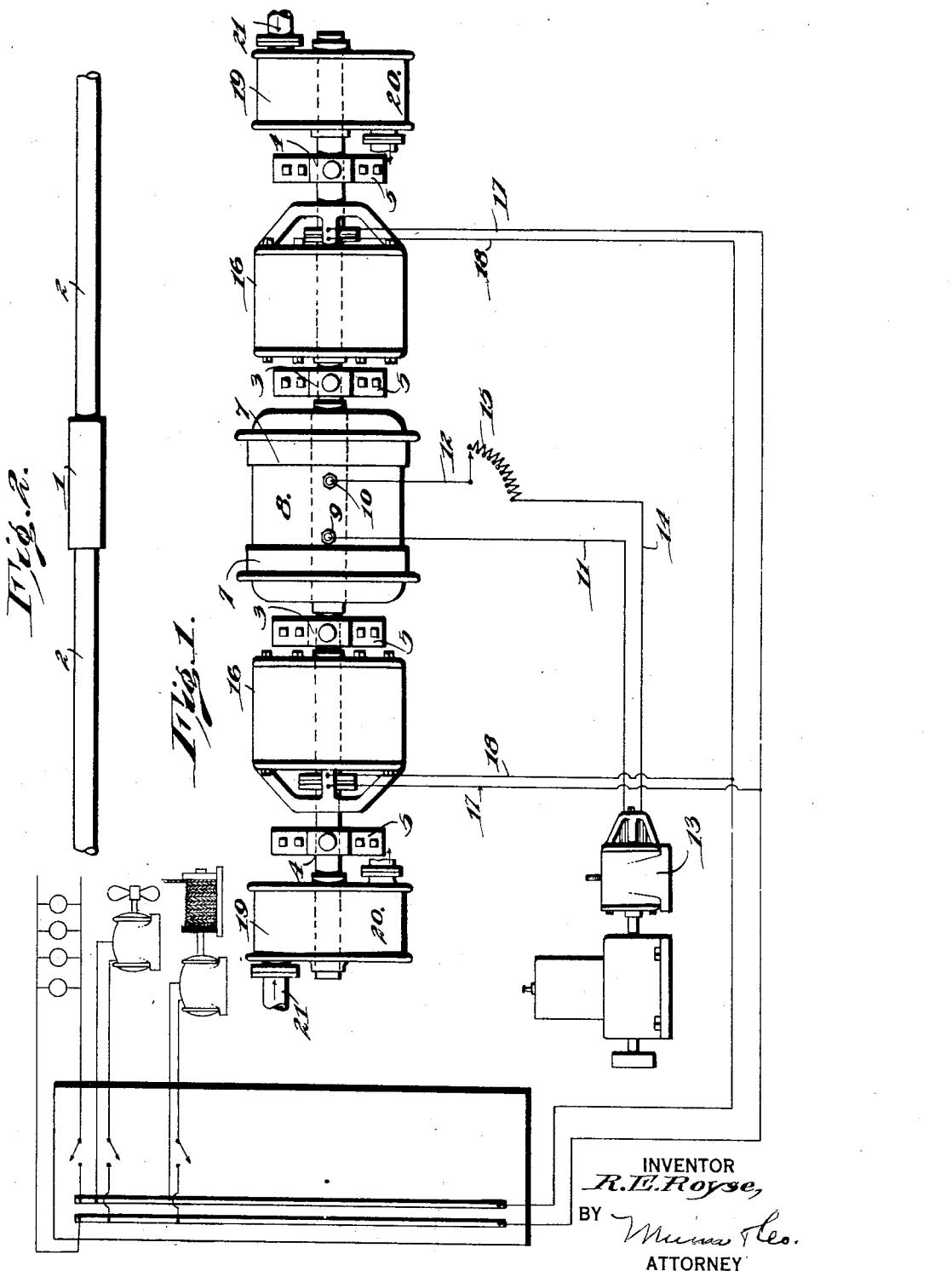

Patented May 21, 1929.

1,714,449

UNITED STATES PATENT OFFICE.

RALPH E. ROYSE, OF TACOMA, WASHINGTON.

COMBINED STEAM ELECTRIC DRIVE FOR GENERATOR SETS.

Application filed July 5, 1928. Serial No. 290,561.

This invention relates to a combined steam-electric drive for generator sets and has for its object an arrangement of steam and electric power drive providing full and flexible accommodation to generator load and shaft torque with a balanced distribution of load on the generator drive shaft.

A feature of the invention consists in the provision, on a generator drive shaft, of a central driving motor of adequate capacity for normal generator load with dual generators uniformly spaced therefrom on the shaft and steam turbines beyond the generators having a joint capacity under full head to impart initially full driving torque to the shaft without generator load, thereafter for normal operation, functioning under reduced head, with the added power of the central driving motor maintaining the full torque of the shaft and automatically varying and accommodating its power input to variations in generator load. In order to apply and economically to use the power of the central drive motor, the central section of the shaft mounting the motor, which motor is necessarily larger than generators and turbines, is of enlarged diameter with the adjoining shaft portions mounting the generators and turbines having a relatively smaller diameter proportioned to their size and power torques.

In three unit sets comprising an elastic fluid turbine, electric driving motor, and electric current generator or other driven machine on a common shaft, it has been the practice to use the motor for normal drive of the shaft, an automatic governor or throttling mechanism being used to cut in the supply of elastic fluid to the turbine when through the load of the generator or other machine, or failure in the current supply to the motor, the R. P. M. speed falls below that set by the governor. In such installations as ordinarily operated, the motor, usually, an alternating current motor, is connected to the main bus bars of a current supply line so that its speed is set by that of the main generator supplying current to the line, the governor of the turbine being set for a speed lower than the normal motor speed. These sets are ordinarily used as auxiliaries to the main power plant. The arrangement of steam-electric drive involved in the present invention, while suitable for use in its smaller sizes of units as an auxiliary to large main set installations is more economically adapted for the main power set itself, and will be described and illustrated as used in this connection.

Current to the main driving motor is supplied, for example, from one or more motor driven generators which may economically be of the Diesel engine type. By preference, a single Diesel motored generator is employed having adequate capacity for normal full generator loads.

The described arrangement of motor, generators and turbines not only provides a balanced load on the shaft of the set and permits the use of a shaft giving maximum motor torque and minimum shaft load, but provides a normal motor drive automatically adapting its current input to variations in shaft and generator load with the turbines functioning under reduced pressure head during normal operation to reduce the load of turbine and generator rotors on the shaft and effective to initially bring the shaft up to speed. Additionally, for ship installation, the turbines may be operated under full head to turn over the shaft to furnish current for the lighting plant with the ship at anchor or docked, the central motor drive being used when the generator load increases, as when the ship is under way and generator current is used for propulsion, or when electric hoists are being operated. The full pressure head operation of the turbines may also be utilized in emergencies to supplement the main central motor drive as when generator output is used for ship propulsion at maximum emergency speed, or the maximum output of the generator set is required in an emergency in a land power plant installation.

The combination of steam and electric drive for the generator set therefore makes it flexible to all conditions of power requirement. The central driving motor will act as a compensator, varying its input of current responsively to generator load, the current requirements of the central drive motor being met by the generator 13 through the usual governor used with engines driving generators, the type of governor varying with the speed type of motor and the nature of the current generated, its effect being to vary the speed of the generator driving motor responsively to the current load placed on its generator.

The invention in its details will be more clearly apparent by reference to the following specification and to the accompanying drawings forming part thereof and in which:—

Figure 1 is a plan view of a line shaft mounting steam-electric driving and current generating elements in accordance with the present invention, the circuit for the central motor drive and the leads from the generators to a distributing board being indicated diagrammatically.

Figure 2 is a plan view of the single drive shaft mounting said elements.

The steam-electric drive of the present invention is, as before stated, mounted upon a single line or length of shafting which, as shown in Figure 2, comprises a central portion 1 of maximum diameter and relatively short length carrying the rotor of a direct current motor of suitable power, and adjacent portions 2 of a reduced diameter upon which are mounted at each side of the rotor section, dual alternating current generators, with steam turbines coupled to the shaft beyond the generators. This shaft is supported in suitable central bearings 3—3 and end bearings 4—4 carried in standards 5 bolted to and uprising from a suitable base 5 which may be the deck or flooring of the engine room of a vessel, or the floor of a shore power plant, for example.

The frame 7 of the central electric driving motor 8 is bolted to the base support 6 and is preferably a direct current motor of standard type and suitable power to the terminals 9 and 10 of which current may be supplied through leads 11 and 12 from motor driven generator 13 of size and power output capable of answering the full power requirements of the motor 8. Advantageously the generator 13 may be provided of the Diesel motor-driven type to provide low fuel and operating costs, and relatively small fuel storage space, a suitable rheostat 15 being interposed to provide for the cutting in and out of the current from the generator 13 to the motor 8. At the opposite ends of the motor 8, the dual alternating current generators 16 are mounted upon the reduced portions 2 of the drive shaft between the central bearings 3 for the driving section of the shaft and the bearings 4 adjacent to the ends of the shaft. The casings of these generators are, as shown, bolted to the base 6 similarly to the motor casing 7. The alternating current generated through operation of the generators is carried by the leads 17 and 18 to bus bars on a main distributing board to be used for any purpose, for example, such as furnishing the power for the lighting plant of a ship, for auxiliary motors to be used for hoists, etc., or for a propeller shaft or shafts as diagrammatically illustrated.

The dual turbines 19 in addition to their function as starting motors have the advantage when operating under a reduced head of steam during shaft drive through the central motor 8, of providing means for relieving the load of the turbine and generator rotors on the drive shaft, and as previously stated, may be used in emergencies to supplement the motor drive of the shaft, and independently of the motor drive, for minimum generator load, as when a set of this character is installed as the main power plane of a vessel as previously recited, and with the vessel anchored, moored or docked, the current output of the generators is to be used only for the lighting plant.

On the ends of the reduced sections 2 of the drive shaft are mounted the rotors of steam turbines 19, the casing 20 of which are bolted to the base 6. Steam is fed to these turbines, which may be of any standard construction, through feed pipes 21 extending from a suitable steam boiler.

These turbines, as previously explained, are used to start the revolution of the drive shaft and to bring it up to full speed. For this purpose, the generator 13 for the central drive motor 8 is disconnected from the motor through a suitable switch, and steam is admitted through the feed pipe 21 to the turbines 19 until the shaft is rotated at the normal full speeed of the generators, at which time a practically full head of steam is operating against the rotors of the turbines. When this point has been reached, the steam head is reduced and the generator 13 is cut into circuit with the drive motor 8 to maintain the shaft in rotation at the desired R. P. M. speed.

What I claim, therefore, and desire to secure by Letters Patent is:

1. A generator set comprising, in combination, a shaft mounted for rotation, an electric driving motor having its rotor mounted thereon, a source of electric current for said motor flexible to the load demands of the shaft thereon, dual electric generators having their rotors mounted on said shaft adjacent to and at each side of said driving motor and a pair of steam turbines having their rotors mounted on the shaft beyond and adjacent to each of said generators and having a maximum joint power output capable of imparting full speed of revolution to said shaft without generator load thereon, said driving motor having a maximum power output capable of maintaining full speed of shaft revolution under full generator load.

2. A generator set comprising, in combination, a shaft mounted for rotation, an electric driving motor having its rotor mounted thereon, a motor-driven generator supplying current to said driving motor responsive to the demands of the shaft load thereon, dual electric generators having their rotors mounted on said shaft adjacent to each side of said motor, and a pair of steam turbines having their rotors mounted on the shaft beyond and adjacent to each of said generators and having a maximum joint power output capable of imparting full speed of revolution to said shaft without generator load thereon, said driving motor having a maximum power output capable of maintaining full speed of shaft revolution under full generator load.

3. A generator set comprising in combination a shaft mounted for rotation and having a driving motor section of increased diameter formed thereon, an electric driving motor therefor having its rotor mounted on said section, a generator for supplying current to said driving motor, a coupled explosive motor for driving said generator governor-controlled to vary the speed of the explosive motor and output of its generator responsively to variation in shaft load on the electric driving motor, dual electric generators having their rotors mounted on said shaft adjacent to said section of increased diameter and at each side of the driving motor, and a pair of elastic fluid turbines having their rotors mounted on said shaft adjacent to and beyond each of said generators and having a maximum joint power output capable of initially imparting full speed of revolution to the shaft without generator load thereon and with the driving motor inoperative, the latter having a maximum power output capable of maintaining the full attained R. P. M. speed of the shaft with full generator load thereon and, with the turbines operating under reduced pressure head to relieve the load of turbine and generator rotors, functioning automatically to compensate for and vary its power input with variations in generator load on the shaft.

RALPH E. ROYSE.